Oct. 27, 1936. F. E. RICE 2,058,631
FAUCET
Filed May 16, 1935 2 Sheets-Sheet 1
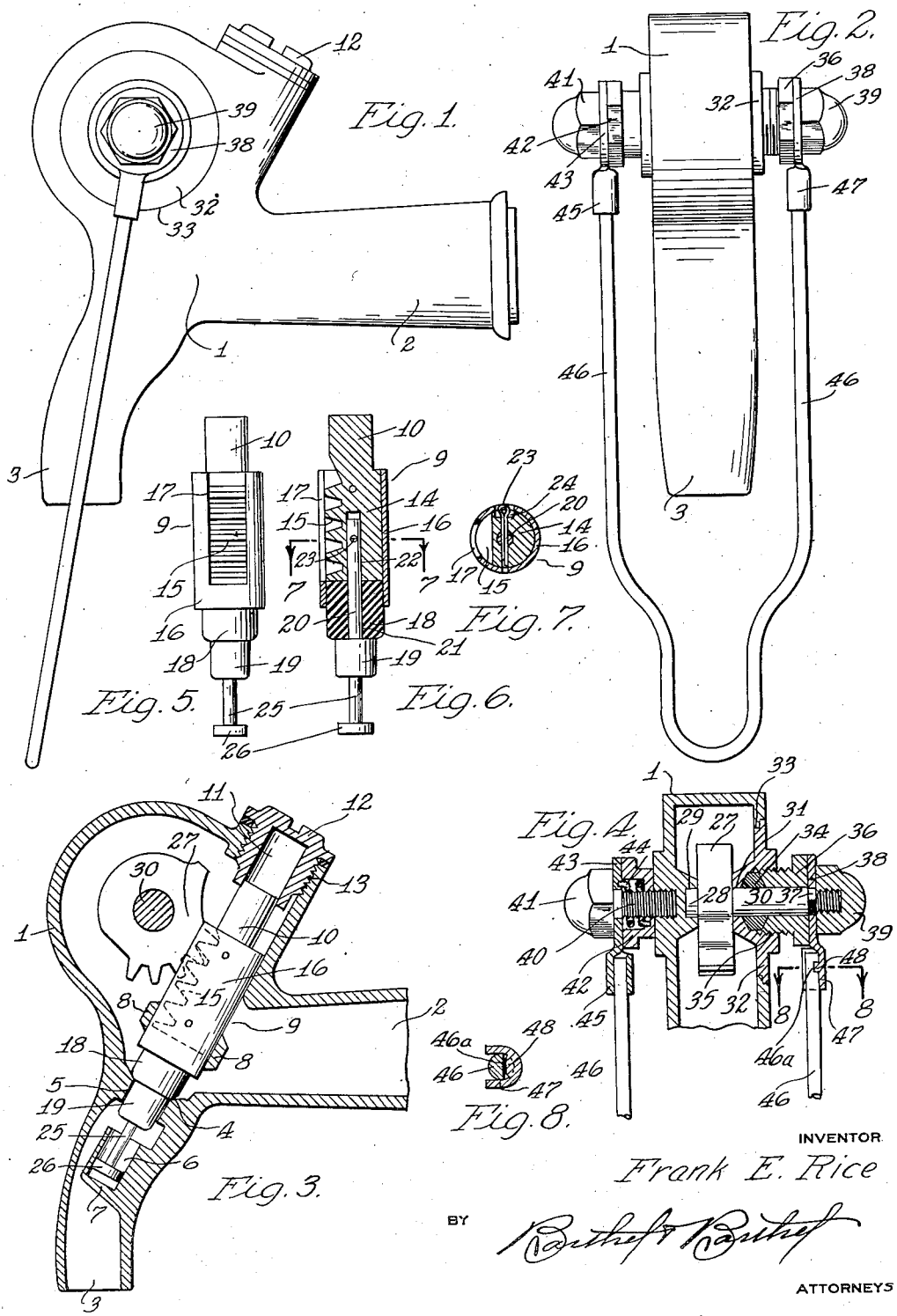
INVENTOR.
Frank E. Rice
BY
ATTORNEYS Oct. 27, 1936.   F. E. RICE   2,058,631
FAUCET
Filed May 16, 1935   2 Sheets-Sheet 2

INVENTOR.
Frank E. Rice
BY
ATTORNEYS

Patented Oct. 27, 1936

2,058,631

UNITED STATES PATENT OFFICE 2,058,631

FAUCET

Frank E. Rice, Detroit, Mich.

Application May 16, 1935, Serial No. 21,795

8 Claims. (Cl. 225—5)

The present invention relates to faucets and has as its primary object to provide a faucet embodying resilient means for moving a valve body therein against its seat and for maintaining it against its seat in the absence of external manual pressure on an operating lever which is adapted to move the valve away from its seat. Generally speaking, such faucets are well known, and the invention more particularly pertains to a faucet embodying means for inhibiting the movement of the valve body which results from the resilient pressure means and the pressure of fluid in the faucet so as to prevent a quick seating action and an abrupt cessation of the flow of fluid through the faucet. The abrupt cessation of the flow is an undesirable function inasmuch as it sets up a hammering noise in the pipe line connected to the faucet, the hammering noise being accompanied with vibrations which tend to do damage to the piping.

Another object of the present invention is to provide a faucet embodying a slidable valve plug having rack teeth to cooperate with a manually movable gear sector and means on said valve plug for maintaining proper meshing between the gear sector and the rack teeth so as to prevent turning of the valve plug and jamming thereof in an open or closed position.

Still another object of the invention is to provide a faucet which is particularly adapted for vending cold beer, that is to say, beer at temperatures ranging in temperature from 34° to temperatures slightly above. At these low temperatures the $CO_2$ gas, which causes beer to effervesce, is not readily liberated from the beer and the present valve is designed to cause the said gas to be liberated and the beer to be drawn in a foamy condition.

With the above and other ends in view the invention is more particularly pointed out with reference to the accompanying drawings, in which—

Figure 1 is a side elevation;

Fig. 2 is a front elevation;

Fig. 3 is a vertical cross section;

Fig. 4 is a fragmentary transverse cross section;

Fig. 5 is an elevation of the valve plug;

Fig. 6 is a cross section of the valve plug;

Fig. 7 is a cross section taken on the line 7—7 of Fig. 6;

Fig. 8 is a cross section taken on the line 8—8 of Fig. 4;

Like characters of reference are employed throughout to designate corresponding parts.

Figure 9:
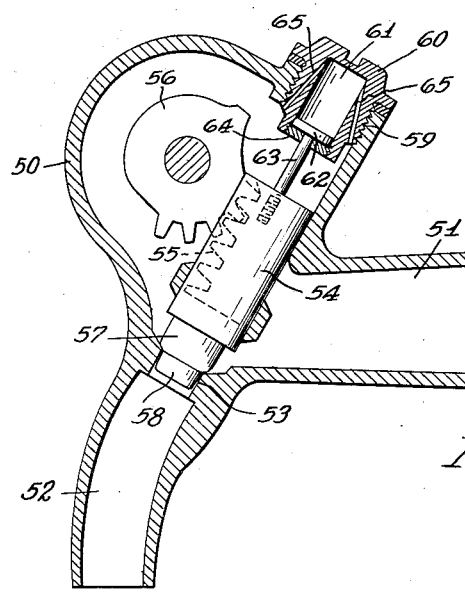
Fig. 9 is a vertical cross section of a modified faucet.
Figure 10:
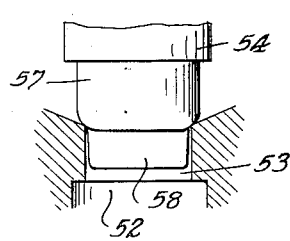
Figs. 10 and 11 are enlarged cross sectional details illustrating the means for causing the beer to foam.
Figure 11:
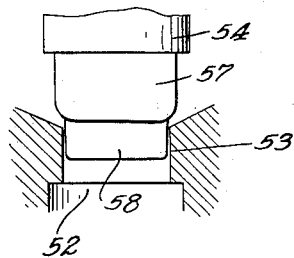

The numeral 1 designates a faucet body having an inlet 2, adapted to be connected to a supply pipe line, and an outlet nozzle 3. In the body 1, between the inlet and the outlet, is formed a valve seat 4, the latter being formed at the top of a bore 5. Concentric with the bore 5, on the outlet side of the valve seat 4, is a cylindrical chamber 6 which is open at its top end and closed at its bottom end by a wall 7.

In the faucet body are formed guides 8 for a valve generally designated 9. On the upper end of the valve is provided a concentric pilot 10 which is received in a guide bore 11 in a plug 12, the latter being screwthreaded into a bore 13 in the upper part of the faucet body.

The valve 9 is of circular cross section and consists of a body 14 having the pilot part 10 formed integral therewith. Formed on the body 14 are rack teeth 15 and surrounding the body 14 is a sleeve 16 having a slot 17 through which the rack teeth are exposed. The sleeve 16 extends beyond the lower end of the body 14 to receive a flexible sealing element 18. A slightly tapered valve element 19 has an integral stem 20 which extends through a bore 21 in the flexible seal 18 and into a bore 22 in the valve body 14. A cotter pin 23 is passed through diametrically extending bores in the stem 20, body 14 and sleeve 16, the diametric bore in the body 14 being countersunk as at 24 to receive the head of the cotter pin. The stem 20 and head 19 thus hold the sealing element 18 in the lower end of sleeve 16 and against the lower end of valve body 14 and it is obvious that the sealing element may thus be easily removed and replaced by removing the cotter pin 23 and the latter may be easily removed by inserting a pointed instrument in the head thereof.

When the valve 9 is assembled in the guides 8 and 11 in the faucet body the tapered valve head 19 is disposed in the bore 5. Projecting axially from the head 19 is a stem 25 having a piston head 26 on the outer end thereof and disposed within the cylindrical chamber 6.

A gear sector 27 has a stub shaft 28 received in a bearing 29 in a side wall of the faucet body and an integral shaft 30 rotatably supported in a bearing 31 in a disk 32 which is permanently secured as by welding, brazing or soldering, in an opening 33 in the other side wall of the faucet body 1. Packing material 34 is compressed in a bore 35, through which the shaft 30 extends, by a screwthreaded element 36. The shaft 30 has a squared portion 37 receiving disk 38 which is secured thereon by a nut 39.

In a screwthreaded bore in the opposite side of the faucet body is received a bolt 40 having a head 41, the bolt 40 being disposed co-axial with the shaft 30. A hollow lock nut 42 is provided on the bolt 40, and interposed between the nut 42 and the bolt head 41 is a loose disk 43. A spring 44 has one end secured in the nut 42 and its other end secured to the disk 43 to normally urge rotation thereof. Integral with the disk 43 is a socket 45 receiving one end of a rod 46, the end of the rod being permanently secured therein. The rod 46 extends downwardly beneath the outlet nozzle 3 to provide an operating handle, as will presently appear, and has its other end notched as at 46a. The notched end of the rod 45 is sprung into a socket 47 which is formed integral with the disk 38, there being a lug 48 provided in the socket 47 to project into the notch 46a.

In operation the spring 44 urges rotation of the disk 43 and thus movement of the rod 46, and the latter causes rotation of disk 38, shaft 30 and gear sector 27. Movement of the gear sector in this manner causes the valve 9 to move so that the sealing member 18 engages the seat 4. When manual pressure is applied against the rod 46 to overcome the pressure of the spring 45 and to move the parts in the reverse direction the valve 9 is moved to carry the sealing element 19 away from the seat 4, it being obvious that the spring 45 will again move the valve 9 to its closed position immediately upon removal of the manual pressure from the rod 46. During such return movement the tapered valve element 19 will cut down the rate of flow through the bore 5 as it enters the latter so that as the sealing member 18 nears the seat 4 the rate of flow will have been reduced considerably. At the same time movement of the piston 26 in the chamber 6 will be retarded by air and liquid in the said chamber and will thus retard movement of the valve 9 and prevent seating of the same at a rate which would cause an abrupt cessation of flow of liquid through the faucet.

In order to remove the valve 9 from the body 1 the plug 12 is removed and the notched end of the rod 46 is sprung out of the socket 47 so that the shaft 30 may be rotated without moving the rod 46.

In Fig. 9 there is illustrated a faucet comprising a body 50 having an inlet part 51 and an outlet 52 separated by a valve seat 53. It will be noted, upon reference to the drawings, that the diameter of the outlet 52 is greater than that of the valve seat and that the center line of the outlet extends at an angle with respect to the center line of the inlet 51.

In the body 50 is a valve plug 54 formed with rack teeth 55 and a gear sector 56 for moving the same in the manner described above. On the lower end of the plug 54 is a valve head 57 cooperating with the seat 53, and on the valve head 57 is provided an extension 58 which is a couple thousandths of an inch smaller in diameter than the valve seat 53 and which projects thereinto when the head 57 is in engagement to the seat or in close proximity thereto. The extension 58 is preferably slightly tapered and it will be understood that the taper illustrated in the drawings and the clearance between this element and the valve seat have been exaggerated in order that they may be readily observed.

An opening 59 in the body 50, through which the plug 54 may be inserted or removed, is closed with a plug 60 having a bore 61 receiving a plunger 62 which is connected to the plug 54 by a rod 63. The plunger 62 is retained in the bore 61 by a ring 64 and ports 65 provide fluid communication between the interior of the faucet body 50 and the bore 61.

A very slight clearance is provided between the wall of the bore 61 and the plunger 62 so that the structure functions in the nature of a dashpot to retard movement of the plug 54. This structure therefore functions in the manner described in connection with the first described embodiment but by placing the retarding means in the plug 60 it is made readily accessible for cleaning purposes. The first described embodiment is primarily intended for use as a water faucet and although it functions satisfactorily for dispensing beer it is found desirable, for sanitary reasons, to place the retarding means where it may be readily reached or replaced for cleaning purposes. This has been found desirable due to the tendency for sediment to collect in crevices or pockets when beer is being dispensed and these sediments, after a time, tend to spoil the taste of the beer.

This valve construction has been found ideal for dispensing cold beer, which ordinarily runs flat, for three main reasons. One reason is that the path of the beer through the faucet changes at an abrupt angle as it leaves the inlet and enters the outlet. Another reason is that the larger diameter of the outlet, as compared with the valve seat, provides an expansion chamber wherein the beer is suddenly relieved of pressure with the result that the action of the $CO_2$ gas in freeing itself from the beer is accelerated. Another reason is that the extension 58 partially restricts the valve seat so that the velocity of the beer is accelerated and the turbulence resulting from the increased velocity causes the beer to release the $CO_2$ gas.

It is obvious from the disclosure that the plug 54 may be moved to a position where the extension 58 is completely withdrawn from the valve seat so as to expose the entire area of the latter. This provides for flexibility in the operation of the faucet so that a part of a glass of beer may be drawn in a more or less "flat" condition and the remainder in a foamy condition so as to regulate the amount of foam in each glass.

Although a specific embodiment of the present invention has been illustrated and described it will be understood that various changes may be made within the scope of the appended claims without departing from the spirit of the invention, and such changes are contemplated.

What I claim is:—

1. In a faucet, a body having a valve seat, a valve in said body, rotatable means for moving said valve into and out of engagement with said seat, and an operating handle having a snap connection with said rotatable means whereby said handle may be disconnected from said means by flexing movement thereof.

2. In a faucet, a body having a valve seat, a valve in said body, rotatable means for moving said valve into and out of engagement with said seat, a substantially U-shaped operating handle, means for rotatably mounting one end of said handle on said body, and a snap connection between the other end of said handle and said rotatable means.

3. A valve element of the character described comprising a body having rack teeth formed thereon, a sleeve on said body having a slot through which said rack teeth are exposed, said sleeve being of greater length than said body whereby to provide a recess for the reception of a sealing element, a sealing element received in said recess, and removable means for securing said sealing element in said recess.

4. A valve element of the character described comprising a body having rack teeth formed thereon, a sleeve on said body having a slot through which said rack teeth are exposed, said sleeve being of greater length than said body whereby to provide a recess for the reception of a sealing element, a sealing element received in said recess, and removable means for securing said sealing element in said recess, said removable means including a tapered head disposed coaxial relative to said sealing member.

5. A valve element of the character described comprising a body having rack teeth formed thereon, a sleeve on said body having a slot through which said rack teeth are exposed, said sleeve being of greater length than said body whereby to provide a recess for the reception of a sealing element, a sealing element received in said recess, removable means for securing said sealing element in said recess, said removable means including a tapered head disposed coaxial relative to said sealing member, a stem projecting axially from said head, and a piston on the outer end of said stem.

6. In a faucet, a body formed with an inlet and an outlet and a valve seat between the inlet and outlet, a valve slidable in said body on the inlet side of the seat, the outlet in said body having a projection integral with the wall thereof and formed with a cylindrical chamber therein, and a plunger carried by said valve and disposed within said chamber.

7. In a faucet, a body formed with an inlet and an outlet and a valve seat between the inlet and outlet, a valve slidable in said body on the inlet side of the seat, the outlet in said body having a projection integral with the wall thereof and formed with a cylindrical chamber therein, a plunger slidably disposed in said chamber, and a rod extending through said valve seat and connecting said valve with said plunger.

8. In a faucet, a body formed with an inlet and an outlet and a valve seat between the inlet and outlet, a valve slidable in said body on the inlet side of the seat, the outlet in said body having a projection integral with the wall thereof and formed with a cylindrical chamber therein, a plunger slidably disposed in said chamber, and a rod extending through said valve seat and connecting said valve with said plunger, said rod having a tapered enlargement thereon normally received within the orifice of said valve seat.

FRANK E. RICE.